United States Patent [19]

Metzler

[11] E Re. 30,359

[45] Reissued Aug. 5, 1980

[54] METHOD OF MAKING PILE WEATHERSTRIPPING

[75] Inventor: Jay C. Metzler, Pittsford, N.Y.

[73] Assignee: Schlegel Corporation, Rochester, N.Y.

[21] Appl. No.: 39,118

[22] Filed: May 15, 1979

Related U.S. Patent Documents

Reissue of:

[64] Patent No.: 4,024,004
Issued: May 17, 1977
Appl. No.: 536,315
Filed: Dec. 26, 1974

[51] Int. Cl.[2] ..... D02G 3/00

[52] U.S. Cl. ..... 156/169; 156/72; 156/172; 156/174; 156/176; 156/428; 156/430; 156/431; 156/432; 156/435; 156/436; 156/446; 156/456; 156/457; 428/85; 428/95; 428/358; 428/369; 428/370

[58] Field of Search ..... 428/85, 95, 358, 359, 428/370; 156/72, 169, 172, 174, 176, 428, 430, 431, 432, 435, 436, 446, 456, 457

[56] References Cited

U.S. PATENT DOCUMENTS

| | | | |
|---|---|---|---|
| 3,360,410 | 12/1967 | Romanin | 156/430 |
| 3,677,851 | 7/1972 | Kayser | 156/169 |

FOREIGN PATENT DOCUMENTS 6903731 9/1970 Netherlands .

*Primary Examiner*—Marion McCamish
*Attorney, Agent, or Firm*—Cumpston & Shaw

[57] ABSTRACT

A pile weatherstripping has a continuous length of a resin anchorage base with even lengths of filaments secured to opposite sides of the base along the length of the base and extending away from the base in the same general direction on each side of the base. The filaments are long enough and dense enough to form insulating pile rows extending out of a retainer slot in which the anchorage base has an interference fit. A sheet resin fin preferably extends continuously outward from the base between the filaments on the opposite sides of the base, and such a weatherstripping is preferably made by wrapping a multifilament yarn around a plurality of bases, securing the yarn to opposite sides of the bases, and then slitting to separate each individual weatherstrip.

2 Claims, 12 Drawing Figures

METHOD OF MAKING PILE WEATHERSTRIPPING

Matter enclosed in heavy brackets [ ] appears in the original patent but forms no part of this reissue specification; matter printed in italics indicates the additions made by reissue.

THE INVENTIVE IMPROVEMENT

Pile weatherstripping is widely applied around doors and windows, and large quantities of pile weatherstripping are made in continuous lengths for such purposes. The standard form for such weatherstripping is a flat base with a woven pile material extending from one side of the base, and the weatherstripping is fitted into a T-shaped slot around a door or window.

The invention involves recognition of a way that simple and economical pile weatherstripping can be made without requiring any weaving in a process that also allows many weatherstrips to be made at the same time. The invention aims at economic, efficient, and high-speed production of pile weatherstrips of good quality. The invention includes a way of making a non-woven pile weatherstrip, as well as the configuration of the resulting weatherstrip.

SUMMARY OF THE INVENTION

The inventive pile weatherstripping has a continuous length of resin anchorage base shaped for an interference fit in a retainer slot, and even lengths of filaments are secured to opposite sides of the base along the length of the base. The filaments extend away from the base in the same general direction on each side of the base, and the filaments are long enough and dense enough to form insulating pile rows extending out of the retainer slot when the base is fitted in the retainer slot. The weatherstripping preferably includes a sheet resin fin extending continuously outward from the base between the filaments on the opposite sides of the base, and the invention includes machinery for forming such weatherstripping, and a method of making such weatherstripping.

DRAWINGS

DETAILED DESCRIPTION

Figure 1:
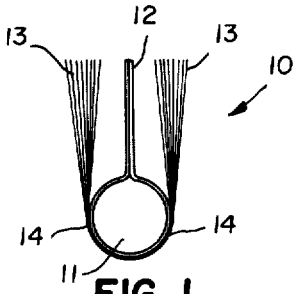
FIG. 1 is an end elevation of one preferred embodiment of the inventive weatherstripping.
Figure 2:
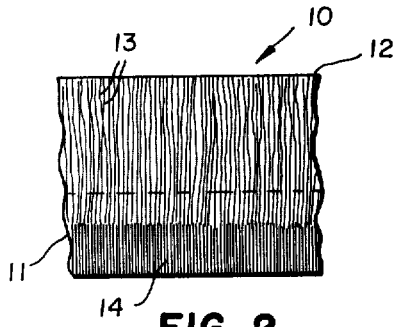
FIG. 2 is a side elevational view of a fragment of the weatherstripping of FIG. 1.

The inventive weatherstripping 10 of FIGS. 1 and 2 is formed with a continuous length of a resin anchorage base 11 that is generally cylindrical as illustrated. A preferably integral, sheet resin fin 12 extends outward from one side of base 11 along the length of base 11, and pile filaments 13 are arranged on each side of sheet 12 and are secured to opposite sides 14 of base 11. Filaments 13 extend along the length of base 11 and are preferably formed of resin monofilaments that can be readily bonded or secured to base 11. Filaments 13 then form a pair of pile rows for a pile weatherseal with fin 12 forming an air and moisture barrier between rows of filaments 13.

Figure 3:
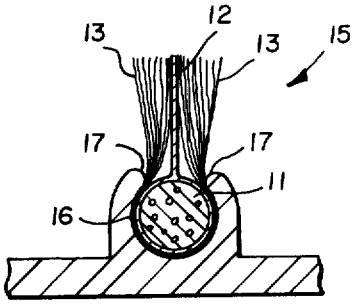
FIG. 3 is a cross-sectional view of another preferred embodiment of the inventive weatherstripping fitted into a retainer slot.

Resin base 11 can be either solid or foamed resin, and FIG. 3 shows a weatherseal 15 having a base 11 of foamed resin and otherwise being similar to weatherseal 10. Weatherseal 15 has any desired cross-sectional shape for providing an interference fit in a retainer slot 16 shown for example as generally cylindrical in shape to receive body 11. The opening at the edges 17 of slot 16 is narrower than the diameter of base 11 to hold base 11 securely in slot 16 and to pinch filaments 13 inward for a well-supported, upstanding pile weatherseal. Slot 16 can be formed in many ways and in many shapes to retain the inventive weatherseal around doors or windows, and base 11 can also have other cross-sectional shapes to be received in correspondingly shaped slots.

Figure 4:
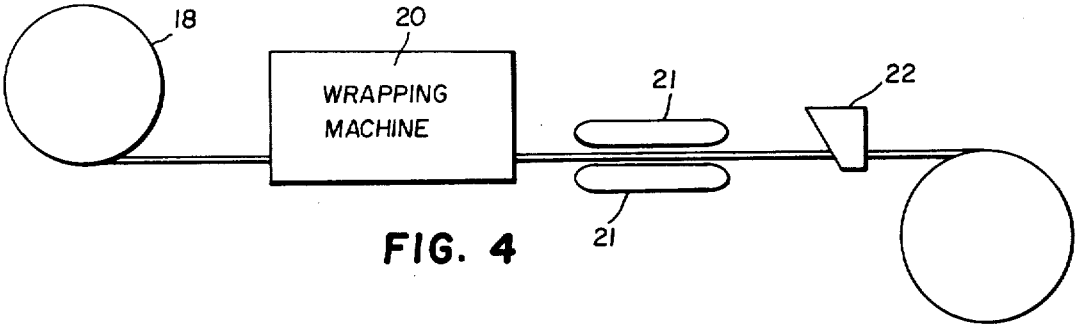
FIG. 4 is a schematic view of one preferred form of equipment for manufacturing the inventive weatherstripping.
Figure 5:
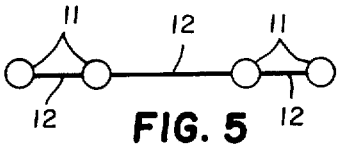
FIGS. 5–8 are cross-sectional views of successive steps in the operation of the equipment of FIG. 4.

Considering FIGS. 5–8 along with FIG. 4 shows a preferred way for making the inventive weatherseal. First, cylindrical rods 11 are formed with interconnecting sheet resin fins 12 in a pattern such as shown in FIG. 5. Any number of rods 11 can be used, and although rods 11 are preferably parallel, they can be formed in arrangements other than a generally flat row. Rods 11 can also be square, rectangular, elliptical, triangular, or have any other desired shape, and rods 11 and sheet connectors 12 are preferably formed as a single extrusion of a suitable resin material with rods 11 being either solid or foamed.

Figure 6:
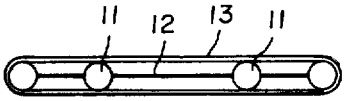
Figure 7:
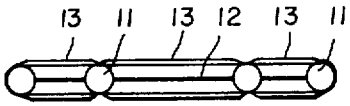

A continuous length of a base material formed of rods 11 and sheet material 12 is wound in a supply coil 18 from which it is advanced through the equipment of FIG. 4. Also, instead of a supply rod material in coil 18, rod material can be fed directly from an extruder forming the rod material. A wrapping machine 20 wraps a multifilament yarn 13 or any desired type of yarn or numbers of yarns continuously round and round the base material as it advances to coil yarn 13 in a close and uniform helix along the entire length of the base material. The result of this is schematically shown in FIG. 6. Then the wrapped base material advances to a heat sealing device 21 that fuses yarn 13 to the opposite sides of each of the bases 11 by applying heat at the tangential junction regions between rods 11 and yarn 13. The result of this is schematically shown in FIG. 7.

Figure 8:
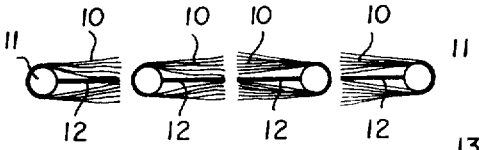

The resulting composite is then slit at appropriate points by a slitter 22 to produce four continuous lengths of weatherstripping 10 as shown in FIG. 8. Slitter 22 cuts through yarn 13 and sheet resin 12 at appropriate points to produce the desired results, and this depends upon how the original base material is designed. There are many ways that rods 11 can be arranged relative to sheet material 12 to be wrapped with one or more yarns 13 and slit to produce weatherstripping having the general configuration of weatherstripping 10.

Figure 9:
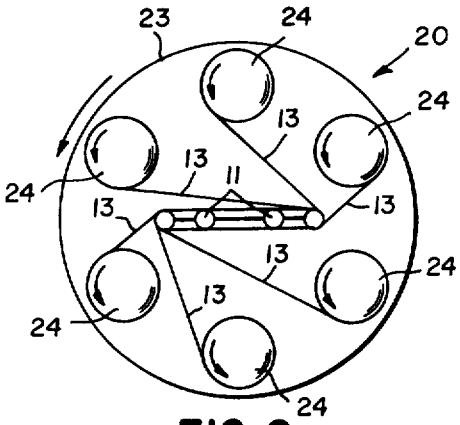
FIG. 9 is a partially schematic end-elevational view of a wrapping machine for the equipment of FIG. 4.

FIG. 9 schematically shows a preferred way of making wrapping machine 20 with a cylinder 23 rotating around the path of travel of rods 11 and carrying a plurality of rotated coils 24 of one or more yarns 13 for wrapping round and round rods 11 as they advance through cylinder 23. The speed of advance of rods 11 is timed with the rotation of cylinder 23 and the uncoiling of coils 24 so that yarn loops 13 are laid side by side continuously for the length of rods 11 to provide continuous rows of filaments 13 when the final product is slit.

Figure 10:
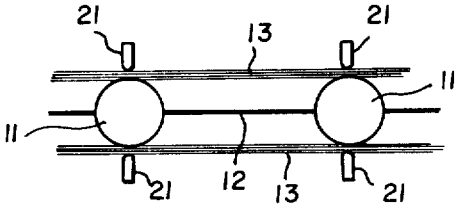
FIG. 10 is a fragmentary cross-sectional view of a heat sealing process in the equipment of FIG. 4.

FIG. 10 schematically shows a preferred way of heat sealing yarn 13 to rods 11 by heating element 21 applying heat at the tangential junction regions between rods 11 and yarn 13. Solvent, adhesive, or other bonds can also be formed between yarn 13 and rods 11. Heating elements 21 can be heated rollers or wheels, heated belts, or heated skid plates that move against yarn 13 and rods 11 at the appropriate points.

Figure 11:
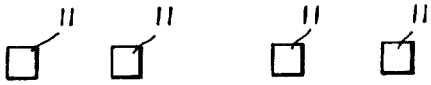
FIG. 11 is a cross-sectional view of another preferred way of arranging bases for manufacture of the inventive weatherstripping.
Figure 12:
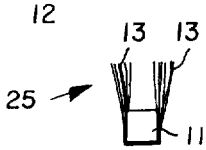
FIG. 12 is an end elevational view of the weatherstripping resulting from the arrangement of FIG. 11.

FIG. 11 illustrates that rods 11 can have shapes other than cylindrical, and also that rods 11 need not be joined together by sheet material 12. Separate rods 11 can be guided by suitable guide means through a wrapping machine to form an ultimate weatherseal 25 as shown in FIG. 12, which has pile filaments 13 secured to opposite sides of square bases 11 without any sheet fin 12 between rows of pile filaments 13.

A fairly large number of rods 11 can be wrapped with yarn and formed into weatherstripping in a single operation so that production capacity for the inventive weatherstripping with equipment comparable to prior art equipment is substantially higher. Also, rods 11 can be wrapped with yarn, the yarn secured to the rods, and the weatherstripping split apart at much faster rates than prior art woven pile weatherstripping could be made. So the invention has many advantages in speed and efficiency over prior art weatherstripping manufacture, and the resulting weatherstrip is also convenient and easy to install by virtue of its base 11 providing a good interference fit with a complementary slot.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will understand the many materials, configurations, and manufacturing techniques that can be used in making the inventive weatherstripping.

I claim:

1. A pile weatherstripping method comprising:
   a. forming a plurality of continuous lengths of a resin anchorage base each having a cross-sectional shape for providing an interference fit in a retainer slot;
   b. advancing said bases in parallel relation;
   c. wrapping a [multi-filament ] *filament* yarn continuously around said bases as they advance to enclose said bases within loops of said yarn;
   d. securing said yarn to the outside of said wrapped bases along opposite sides of each of said bases;
   e. slitting said yarn to separate said plurality of said wrapped bases and to provide each of said bases with a pair of insulating pile rows extending generally tangentially outward in the same general direction from each of said opposite sides of said bases; and
   f. using said bases to anchor said weatherstrip in said retainer slot and press said pile rows against opposite sides of said retainer slot so said pair of pile rows extends outward from said retainer slot.

2. The method of claim 1 including forming resin sheet material joining adjacent ones of said parallel bases and slitting said resin sheet when said yarn is slit to form a sheet resin fin extending continuously outward from said base between said pile rows on said opposite sides of said base.

* * * * *